US012784317B2

(12) United States Patent
Peng et al.

(10) Patent No.: US 12,784,317 B2
(45) Date of Patent: Nov. 3, 2026

(54) MACHINE LEARNING MODELS FOR GENERATIVE HUMAN MOTION SIMULATION

(71) Applicant: NVIDIA Corporation, Santa Clara, CA (US)

(72) Inventors: Jason Peng, Vancouver (CA); Ye Yuan, Santa Clara, CA (US); Davis Winston Rempe, Redwood City, CA (US); Umar Iqbal, Fremont, CA (US); Or Litany, Sunnyvale, CA (US); Tingwu Wang, Toronto (CA); Chen Tessler, Zichron Yaakov (IL); Jan Kautz, Lexington, MA (US); Sanja Fidler, Toronto (CA); Michael Buttner, Georgetown (CA)

(73) Assignee: NVIDIA Corporation, Santa Clara, CA (US)

( * ) Notice: Subject to any disclaimer, the term of this patent is extended or adjusted under 35 U.S.C. 154(b) by 151 days.

(21) Appl. No.: 18/413,967

(22) Filed: Jan. 16, 2024

(65) Prior Publication Data

US 2025/0232505 A1 Jul. 17, 2025

(51) Int. Cl.
*G06T 13/40* (2011.01)
*G06F 40/40* (2020.01)
*G06T 7/20* (2017.01)

(52) U.S. Cl.
CPC .............. *G06T 13/40* (2013.01); *G06F 40/40* (2020.01); *G06T 7/20* (2013.01)

(58) Field of Classification Search
CPC ............ G06T 13/40; G06T 7/20; G06F 40/40
See application file for complete search history.

(56) References Cited

U.S. PATENT DOCUMENTS 6,326,963 B1 * 12/2001 Meehan .................. G06T 19/00 345/473
8,180,714 B2 5/2012 Corazza et al.
(Continued)

FOREIGN PATENT DOCUMENTS

WO WO-2021/034443 A1 2/2021

OTHER PUBLICATIONS

Wang, Zhenzhi, et al. "Intercontrol: Generate human motion interactions by controlling every joint." CoRR (2023). (Year: 2023).*
(Continued)

*Primary Examiner* — Kent W Chang
*Assistant Examiner* — Karl Duc Truong
(74) *Attorney, Agent, or Firm* — Foley & Lardner LLP

(57) ABSTRACT

Systems and methods are disclosed relating to receiving at least one of a text prompt or a kinematic constraint, generating, by a motion model including a first model and a second model, human motion data of a human character by applying a random noise and the at least one of the text prompt or the kinematic constraint into the motion model. Generating the human motion data includes, for each iteration of diffusion determining, using the first model, global root motion by applying noisy global root motion and noisy local joint motion as inputs into the first model and determining, using the second model, local joint motion by applying the noisy local joint motion and local root motion as inputs into the second model. The local root motion is determined based on the global root motion. The human motion data includes the local joint motion and the global root motion.

20 Claims, 7 Drawing Sheets

(56) References Cited

U.S. PATENT DOCUMENTS

| | | | | |
|---|---|---|---|---|
| 8,928,672 | B2 | 1/2015 | Corazza et al. | |
| 11,361,507 | B1 | 6/2022 | Iqbal et al. | |
| 11,417,011 | B2 | 8/2022 | Iqbal et al. | |
| 11,488,418 | B2 | 11/2022 | Iqbal et al. | |
| 2007/0104351 | A1 | 5/2007 | Yang et al. | |
| 2010/0259547 | A1 | 10/2010 | De Aguiar et al. | |
| 2014/0085313 | A1* | 3/2014 | Hodgins | G06T 13/80 345/473 |
| 2014/0160116 | A1 | 6/2014 | De Aguiar et al. | |
| 2016/0216770 | A1* | 7/2016 | Jang | G06F 3/017 |
| 2019/0304104 | A1* | 10/2019 | Amer | G06N 3/044 |
| 2020/0226357 | A1* | 7/2020 | Protter | G06V 40/23 |
| 2021/0082170 | A1 | 3/2021 | Chentanez et al. | |
| 2021/0150757 | A1 | 5/2021 | Mustikovela et al. | |
| 2021/0233273 | A1 | 7/2021 | Spurr et al. | |
| 2021/0335028 | A1 | 10/2021 | Yang et al. | |
| 2022/0020199 | A1* | 1/2022 | Villegas | G06T 13/40 |
| 2022/0066544 | A1* | 3/2022 | Kwon | G06V 20/41 |
| 2023/0004760 | A1 | 1/2023 | Mustikovela et al. | |
| 2023/0005203 | A1 | 1/2023 | Shi et al. | |
| 2023/0337989 | A1* | 10/2023 | Su | A61B 5/743 |
| 2024/0054671 | A1* | 2/2024 | Oreshkin | G06V 10/44 |
| 2024/0070854 | A1 | 2/2024 | El-Sallam et al. | |
| 2024/0153184 | A1* | 5/2024 | Li | G06T 13/40 |
| 2024/0161327 | A1* | 5/2024 | Chen | G06T 3/40 |
| 2024/0185498 | A1* | 6/2024 | Francis | G06T 15/00 |
| 2024/0241573 | A1* | 7/2024 | Peris | G06F 3/0346 |
| 2024/0307783 | A1 | 9/2024 | Menapace et al. | |
| 2024/0331251 | A1 | 10/2024 | Santesteban Garay et al. | |
| 2024/0394511 | A1* | 11/2024 | Thevenin | G06N 3/088 |
| 2024/0412726 | A1* | 12/2024 | Delmas | G10L 15/197 |
| 2024/0420407 | A1* | 12/2024 | Ntavelis | G06T 19/20 |

OTHER PUBLICATIONS

Tevet, Guy, et al. "Human motion diffusion model." arXiv preprint arXiv:2209.14916 (2022). (Year: 2022).*

Yuan, Ye, et al. "PhysDiff: Physics-Guided Human Motion Diffusion Model." arXiv preprint arXiv:2212.02500 (2022). (Year: 2022).*

Karunratanakul, Korrawe, et al. "Guided motion diffusion for controllable human motion synthesis." Proceedings of the IEEE/CVF International Conference on Computer Vision. 2023. (Year: 2023).*

Qi, Qiaosong, et al. "DiffDance: Cascaded Human Motion Diffusion Model for Dance Generation." arXiv preprint arXiv:2308.02915 (2023). (Year: 2023).*

Ren, Zeping, Shaoli Huang, and Xiu Li. "Realistic Human Motion Generation with Cross-Diffusion Models." arXiv preprint arXiv:2312.10993 (2023). (Year: 2023).*

Van Wouwe, Tom, et al. "Diffusion inertial poser: Human motion reconstruction from arbitrary sparse imu configurations." CORR (2023). (Year: 2023).*

Zhang, Mingyuan, et al. "ReMoDiffuse: Retrieval-Augmented Motion Diffusion Model." arXiv preprint arXiv:2304.01116 (2023). ( Year: 2023).*

Zhang, Siwei, et al. "RoHM: Robust Human Motion Reconstruction via Diffusion." arXiv preprint arXiv:2401.08570 (2024). (Year: 2024).*

Shafir, Yonatan, et al. "Human motion diffusion as a generative prior." arXiv preprint arXiv:2303.01418 (2023). (Year: 2023).*

* cited by examiner

MACHINE LEARNING MODELS FOR GENERATIVE HUMAN MOTION SIMULATION

BACKGROUND

Large language models (LLMs) and image synthesis models are successful due to massive language and image datasets that are available for training. On the other hand, the amount of available motion data is orders of magnitudes scarcer as compared to language and image datasets. Absent a massive data collection effort to acquire a vast amount of high-quality motion capture (mocap) data, which can be extremely time-consuming and resource-intensive, general-purpose and high-quality motion synthesis models are substantially challenging to improve.

SUMMARY

Some embodiments relate to a system including one or more processing circuits. The one or more processing circuits are configured to receive at least one of a text prompt or a kinematic constraint, generate, by a motion model including a first model and a second model, human motion data of a human character by applying a random noise and the at least one of the text prompt or the kinematic constraint into the motion model. Generating the human motion data includes, for each iteration of diffusion determining, using the first model, global root motion by applying noisy global root motion and noisy local joint motion as inputs into the first model and determining, using the second model, local joint motion by applying the noisy local joint motion and local root motion as inputs into the second model. The local root motion is determined based on the global root motion. The human motion data includes the local joint motion and the global root motion.

Some embodiments relate to a system including one or more processing circuits. The one or more processing circuits are configured to perform a plurality of iterations of a diffusion process. At least one iteration of the plurality of iterations includes generating, by a motion model including a first model and a second model, human motion data of a human character by applying a random noise and at least one of a text prompt or a kinematic constraint into the motion model. Generating the human motion data includes determining, using the first model, global root motion by applying noisy global root motion and noisy local joint motion as inputs into the first model and determining, using the second model, local joint motion by applying the noisy local joint motion and local root motion as inputs into the second model. The local root motion is determined based on the global root motion. The human motion data includes the local joint motion and the global root motion.

Some embodiments relate to a method including performing a plurality of iterations of a diffusion process. at least one iteration of the plurality of iterations includes generating, by a motion model including a first model and a second model, human motion data of a human character by applying a random noise and at least one of a text prompt or a kinematic constraint into the motion model. Generating the human motion data includes determining, using the first model, global root motion by applying noisy global root motion and noisy local joint motion as inputs into the first model and determining, using the second model, local joint motion by applying the noisy local joint motion and local root motion as inputs into the second model. The local root motion is determined based on the global root motion. The human motion data includes the local joint motion and the global root motion.

Disclosed embodiments can be included in or provide data for a variety of different systems for generating and consuming human motion data, such as automotive systems having control systems for an autonomous or semi-autonomous machine (e.g., an AI driver, an in-vehicle infotainment system, and so on) and/or a perception system (e.g., sensor systems and so on) for an autonomous or semi-autonomous machine, systems implemented using a robot, aerial systems, medical systems, boating systems, smart area monitoring systems, systems for performing deep learning operations, systems for performing simulation operations, systems for generating or presenting virtual reality (VR) content, augmented reality (AR) content, and/or mixed reality (MR) content, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations, systems implementing one or more language models-such as one or more LLMs, systems for hosting real-time streaming applications, systems for performing light transport simulation, systems for performing collaborative content creation for 3D assets, systems implemented at least partially using cloud computing resources, and/or other types of systems.

BRIEF DESCRIPTION OF THE DRAWINGS

The present disclosure is described in detail below with reference to the attached drawing figures, wherein.

DETAILED DESCRIPTION

The present disclosure relates to human motion foundation models, models for generating virtual actors/characters and motion data thereof, general-purpose human motion models, and so on (collectively referred to as human motion foundation models) that can be applied to a wide range of applications such as motion synthesis and perception. A system described herein allows users to effectively generate high-quality life-like human motions through simple and intuitive interfaces including language (e.g., text-to-motion mechanisms), keyframes, and flexible kinematic constraints. The outputs of the system is compatible with existing animation pipelines to allow human modeling workflows described herein to be accessible, intuitive, and versatile for experts and non-experts alike. The human motion foundation models described herein can be adapted to various downstream applications and specialized domains.

Figure 1:
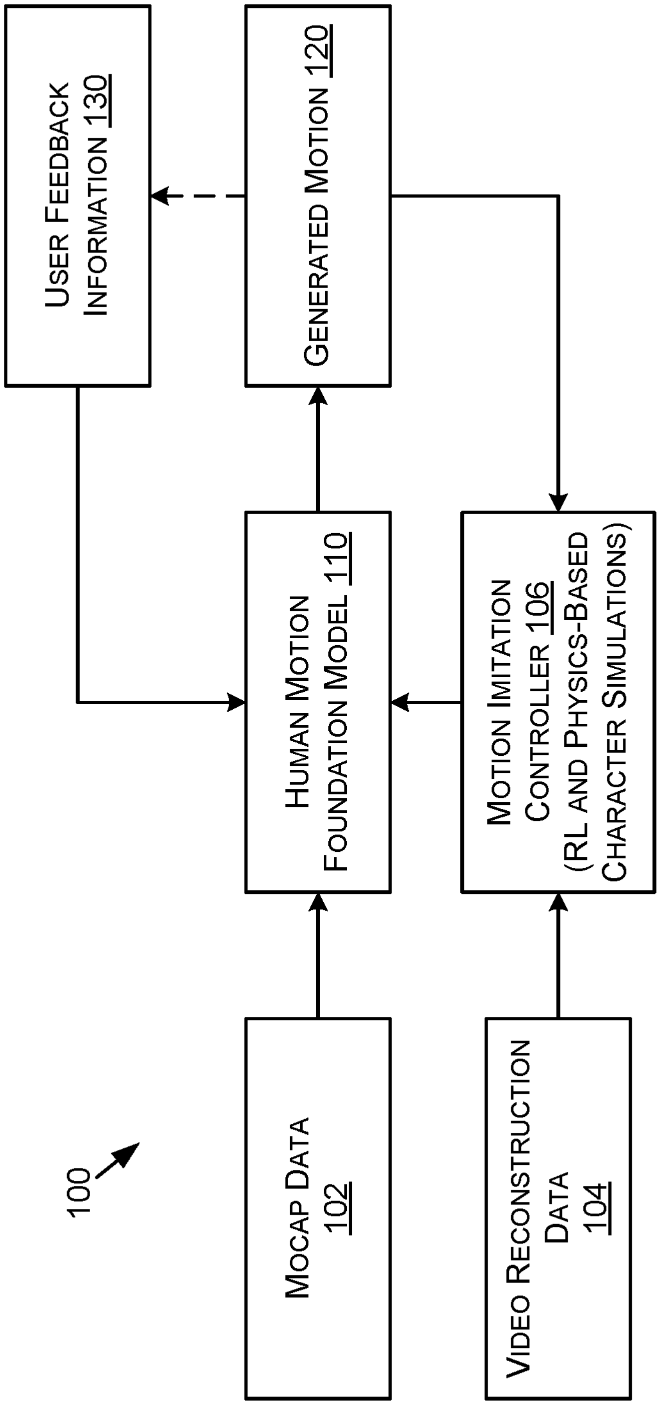
FIG. 1 is a block diagram illustrating an example training method for training a human motion foundation model, in accordance with some embodiments of the present disclosure.

FIG. 1 is a block diagram illustrating an example training method 100 for training a human motion foundation model 110, according to some embodiments. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

To address the scarcity of large-scale motion data sets, various types of data sources and feedback mechanisms can be used to train (e.g., update) a general-purpose and high-quality human motion foundation model 110. Examples of the data sources used to update the human motion foundation model 110 include motion capture data (e.g., mocap data 102), motion reconstruction from videos (e.g., video reconstruction data 104), and user feedback information 130.

The mocap data 102 includes high-quality motion data provided via motion capture techniques. The mocap data 102 can include kinematic models, planar models (e.g., 2D models), or volumetric models (e.g., 3D models) of human characters over a period of time. The mocap data 102 includes motion clips such as those represented using a series of skeleton poses. Examples of the mocap data 102 include publicly available datasets such as Archive of Motion Capture As Surface Shapes (AMASS) dataset. Given that current sources of the mocap data 102 are low-volume, the mocap data 102 can serve as sparse examples of various classes of human motions and human behaviors for training the human motion foundation model 110.

In addition, to increase the quantity of the mocap data 102, the mocap data 102 can be expanded to new data sets beyond what is publicly available. For example, the mocap data 102 can be collected for static motions or relatively static motions, common behaviors, compositional behaviors, and domain-specific behaviors. Characters posing with static motions or relatively static motions can also be referred to as posing characters. A static motion can include a recognizable and defined pose in a static frame (e.g., one frame in a moment in time or a time step). A relatively static motion (motions in two frames, three frames, no more than five frames, no more than ten frames, and so on) can include a recognizable and defined pose depicted in multiple frames (e.g., frames in a moment in time or time steps). Examples of static motions or relatively static motions include "jumping," "squatting," "placing hand on head," "touching toes," "standing on one leg," and so on. Such static or relatively static motions provide simple motion primitives, which can be selectively combined to compose more complex behaviors. A language-directed dataset for static or relatively static motions can in itself be useful for a variety of applications, such as data-driven Inverse Kinematics (IK).

Characters performing common behaviors are performing ordinary, everyday motions that are short and distinct. In some examples, a common behavior includes multiple frames of a same type of static motions or relatively static motions. A character performing a common behavior does so in a recognizable and defined series of poses. Types of common behaviors include locomotion behaviors, outdoor and indoor activities, object interactions (e.g., picking objects up, sitting/lying down on furniture, and so on). Examples of common behaviors include "walking, "jumping," "opening a door," "sitting down," and so on. A common behavior can span a few numbers of frames or a few time steps.

Characters performing compositional behaviors are performing combinations of multiple behaviors simultaneously or in sequence. In some examples, a common behavior includes a recognizable and defined aggregate behavior that includes multiple common behaviors performed simultaneously or in sequence. The compositional behavior data can be used to "bootstrap" the human motion foundation model 110 to compose different behaviors and to generalize novel compositions. In some examples, a compositional behavior includes a combination (e.g., a temporal composition) of a sequence of behaviors (e.g., common behaviors) and transitions between two behaviors, with each frame of the compositional behavior capturing one behavior or one transition between behaviors. An example temporal composition includes "walking to a chair and sitting down," "getting out of a car, walking to the door, and opening the door," and so on. In some examples, a compositional behavior includes a combination (e.g., a spatial composition) of simultaneous behaviors (e.g., common behaviors), in which multiple behaviors are captured in each of a plurality of frames. An example temporal composition includes "walking while talking on the phone," "running and pushing stroller," and so on.

Characters performing domain-specific behaviors are performing one or more of compositional behaviors, common behaviors, static motions, or relatively static motions for a given target application. Examples of target applications include behaviors in factory settings, sports and athletics, pedestrian behaviors for autonomous driving application, and so on. In some examples, the mocap data 102 for domain-specific behaviors can be labeled with the corresponding names and/or description of the domains, to allow fine-tuning of the human motion foundation model 110 for those domains. A behavior described herein can refer to one or more of a common behavior, a compositional behavior, or a domain-specific behavior.

To provide data in addition to the mocap data 102, scalable techniques such as human motion data (e.g., video reconstruction data 104) reconstructed from videos can be used. In some examples, the video reconstruction data 104 can be treated using reinforcement learning (RL), physics-based character simulations, and user feedback information 130. Such video reconstruction data 104 can generalize and expand the motion repertoire beyond what is available through the mocap data 102. As shown, the video reconstruction data 104 is applied as input to a motion imitation controller 106, which is trained (e.g., updated) using RL and physics-based character simulations. The mocap data 102 and the output of the motion imitation controller 106 are applied as supervision to train the human motion foundation model 110, for example, as inputs into a training pipeline of the human motion foundation model 110. The human motion foundation model 110 generates the generated motion 120 (e.g., human motion data), which is provided to human users to obtain user feedback information 130. The generated motion 120 can be provided to the motion imitation controller 106 (e.g., for the RL and physics-based character simulations) which can clean up generated motion 120 by removing artifacts such as foot skating, floating, ground penetration, and so on. The motion imitation controller 106 is pre-trained using mocap data 102.

While not as high-quality as the mocap data 102 traditionally, video data (e.g., videos, video clips, a series of frames, and so on) from which the video reconstruction data 104 are extracted can be abundant sources of motion data, and can have greater volume than the mocap data 102. In some examples, pose estimation models can be used to extract human motions from video data capturing humans performing various types of actions, activities, tasks, and behaviors. That is, the video reconstruction data 104 is determined by applying video data as an input to one or more pose estimation models. A pose estimation model determines or predicts, for input video data, attributes (e.g., dimensions, positions, rotations, orientations, and angles) of body parts and joints of a human character. Examples of pose estimation models include MoveNet, OpenPose, PoseNet, and so on. The video reconstruction data 104 includes human motion data, such as data (e.g., kinematic data, planar data, or volumetric data) of human characters over a period of time. Given that video data is widely available, the video reconstruction data 104 generated using the video data can likewise be voluminous, thus compensating for the lack of available mocap data 102.

In some embodiments, the video data based on which the video reconstruction data 104 is generated can be accompanied by corresponding text labels or descriptions, which can be provided through a combination of human annotators and automatic video captioning systems. For example, the automatic video captioning system can transcribe audio of video data and provide at least a portion or the entirety of the transcription as text labels and descriptions for the video reconstruction data 104 derived from the video data. The video reconstruction data 104 has the same text label or descriptions as that of the video data based on which that video reconstruction data 104 is generated. That is, in the example in which a video is labeled "man hitting a baseball with a bat," the corresponding video reconstruction data 104 can be likewise labeled "man hitting a baseball with a bat." In such embodiments, the video reconstruction data 104 and the corresponding text labels or descriptions can be provided to the motion imitation controller 106 and the human motion foundation model 110. In other embodiments, the video data and the video reconstruction data 104 derived therefrom are unlabeled. In some embodiments, the text description can be obtained using a vision-language model (e.g., LLaVa, InstructBlip, OpenFlamingo, etc.) that directly operates on the video frames of the video data to understand the content of the video data.

While pose estimation models and techniques are improving rapidly, there remains a large quality gap between motions from pose estimators and those recorded through mocap. Priors can be incorporated into the motion reconstruction process to improve motion quality and filter out low-quality clips. In some examples, heuristics can be used to filter poor reconstruction results. In some examples, the motion foundation model 110 can provide kinematic priors to regularize reconstructed motions. In some examples, physics-based motion trackers can also be used to remove non-physical artifacts in the video reconstruction data 104.

To improve the quality of the video reconstruction data 104, priors from the human motion foundation model 110, RL, and physics-based character simulations can be used to improve the quality of the video reconstruction data 104 by removing physics-implausible artifacts. In other words, the RL and physics-based character simulations can be used to train the motion imitation controller 106, which can be used as a physics-filter to mitigate (e.g., filter out, remove, and so on) physics-implausible artifacts from the video reconstruction data 104. RL and physics-based simulation can be used to filter out physically implausible artifacts given that the physics-based simulation is aimed to produce motions that follow the laws of physics. In the original motion data, due to noise, inaccuracies, and other forms of mismatch, the motion can possibly violate the laws of physics. By attempting to reconstruct a motion in a physics-based simulation with RL, the physically plausible motion closest to the original video reconstruction data 104 can be identified, thus removing some nonphysical artifacts which are the differences between the video reconstruction data 104 and the physically plausible motion closest to the video reconstruction data 104. Accordingly, the output of the human motion foundation model 110 can be tracked (e.g., reconstructed) using simulation (e.g., using RL-based neural network models) to fix the output of the human motion foundation model 110. The fixed output of the human motion foundation model 110 can be used as new training data for the human motion foundation model 110. Simulations are more plausible than the noisy data that the simulations are tracking. The RL and physics-based character simulations can also increase human motion diversity by generating variations of existing motions (e.g., the generated motion 120 or the video reconstruction data 104) and adapt those existing motions to new settings. The motions produced by the motion imitation controller 106 can therefore be used to augment the dataset including the mocap data 102 and the video reconstruction data 104 by generating variations of motions in the dataset and adapting existing motions to new settings. For example, RL can train (e.g., update) the motion imitation controller 106 to generate simulated human motion data that imitates the generated motion 120. RL and physics simulations can be used to generate additional human motion data. In an example involving a walking motion on flat ground, a walk motion for a character on bumpy ground can be simulated using RL to train a character in a physics simulation to follow the original walking motion as closely as possible while walking on bumpy ground. Some responsive behaviors can be automatically generated for a character in order to adapt the original walking motion to a new setting without obtaining new data from real actors.

In some examples, for detailed and specific commands (e.g., text prompts) such as "run forward at 5 m/s," "run forward at 10 m/s," or "walking up a 15 degree incline," recording video data for all variations of such detailed task specifications can be difficult, as there can be a large number or an infinite number of variations. Therefore, RL can be used to train simulated characters to imitate the generated motions 120 generated from the human motion foundation model 110 while also satisfying additional task requirements. Labels or descriptions can be generated automatically for the newly generated human motions corresponding to these tasks and appended to the labels or descriptions of the original motion clip (e.g., the generated motions 120).

Physics-based character simulations can generate new transitions (e.g., new human motion data) between behaviors that are not in the video reconstruction data 104 or the generated motion 120. That is, in the examples in which the video reconstruction data 104 or the generated motion 120 includes a first behavior (e.g., a first common behavior, first compositional behavior, or first domain-specific behavior) followed temporally by a second behavior (e.g., a second common behavior, second compositional behavior, or second domain-specific behavior), the physics-based character simulations can be trained to generate transition motion data (human motion data) between the first behavior and the second behavior. The transition motion data between two behaviors includes a model (e.g., kinematic models, planar models, or volumetric models) of a human character between the last frame of the first behavior and a first frame of the second behavior. The datasets including sequences of behaviors defined by text prompts are unlikely to contain transitions between all possible behaviors. RL can be used to train simulated characters to generate plausible transition motion data between different behaviors, and the simulated motions can be used to augment the dataset.

The RL and physics-based character simulations can be used to develop a versatile motion tracking model(s) for cleaning up artifacts of motion data (e.g., from the video data) and improve the physical realism of generated motion 120 generated by the human motion foundation model 110.

In some embodiments, for a new class of behaviors to be generated using the human motion foundation model 110, the mocap data 102 can be used to collect a small set of high-quality examples. The video reconstruction data 104 and the RL and physics-based character simulations (e.g., for the motion imitation controller 106) can be used to expand on these examples to improve or train (e.g., update) the human motion foundation model 110 to output the range of motions (e.g., the generated motion 120) for that new class of behaviors.

The generated motions 120 (e.g., generated human motion data) can be in a suitable motion and/or gesture file format that presents an animation or movement of a human character in a kinematic model, planar models, or volumetric model through space defined by a coordinate system and over a period of time. The generated motions 120 can be rendered by a suitable graphical processor to be displayed on a display screen, for a user to provide the user feedback information 130.

In some embodiments, the user feedback information 130 can improve the quality of the generated motions 120 and to generate new behaviors that are absent in the dataset, including the mocap data 102 and the video reconstruction data 104. The generated motions 120 can be rendered and provided to users via user devices that contain displays to solicit the user feedback information 130. The user feedback information 130 can be provided to the human motion foundation model 110 to finetune the human motion foundation model 110. The user feedback information 130 can include one or more types of feedback described herein. In some examples, the user feedback information 130 can also be provided for the video reconstruction data 104 (as treated by the RL and the physics-based character simulation) to update the motion imitation controller 106.

In some examples, the user feedback information 130 can include a rating or a score indicative of the quality of the generated motion 120 as perceived by a user. For example, the user can be instructed to provide a score indicating the relevance of the generated motion 120 to a text prompt used to generate the generated motion 120. During training, the text prompt can be inputted into the human motion foundation model 110 as a constraint, or the text prompt can be a label or description of the video reconstruction data 104 or the mocap data 102. In some examples, the higher the score, the most closely related or relevant the generated motion 120 is to the text prompt for which the generated motion 120 is generated. In some examples, the user can be instructed to provide a score indicating a number or seriousness of artifacts present in the generated motion 120. This type of user feedback information 130 can be used to fine-tune or update the human motion foundation model 110 using a ranking loss corresponding to the ranking, e.g., Reinforcement Learning from Human Feedback (RLHF). Such user feedback information 130 can be likewise provided for the video reconstruction data 104. In some embodiments, training the human motion foundation model 110 can be achieved using noisy data directly from the video reconstruction data 104. The human motion foundation model 110 can be informed about such noisy training data by conditioning on a specific text label e.g., "noisy" or "clean" motion of a human character. In some examples, a learnable embedding for conditioning can be used where the human motion foundation model 110 receives a specific embedding when the human motion foundation model 110 is trained on clean data and a different embedding when the human motion foundation model 110 is trained using noisy data. In some embodiments, noisy data can be used to train the coarse stages of the human motion foundation model 110, and clean data can be used to train the finer stages of the human motion foundation model 110.

Given a new text prompt that is not present in the dataset (e.g., a text prompt that is not used as a label for any of the mocap data 102, the video reconstruction data 104, or the video data used to generate the video reconstruction data 104), the human motion foundation model 110 can be used to synthesize multiple candidate generated motions 120. That is, the generated motion 120 includes multiple candidate generated motions 120. Users who are human annotators can then select the best motion out of the candidate generated motions 120 for the given prompt or rank the candidate generated motions 120 (e.g., ranks 1-N, where N is the number of the candidate generated motions 120). This type of user feedback information 130 can be used to fine-tune or update the human motion foundation model 110 using a ranking loss corresponding to the ranking, e.g., RLHF.

In some examples, users who are human annotators can label the generated motions 120 with at least one of text labels or text descriptions that describe the generated motions 120. The generated motions 120 can also include multiple candidate generated motions generated for a same text prompt as described herein. Such labels and text descriptions can be used to enrich the text labels for a particular behavior by providing updated labels and text descriptions. Such labels and text descriptions can be used to correct incorrect motions that do not match the original prompts given that the labels and text descriptions generated by the user may not match the original prompts.

Given motions generated by the human motion foundation model 110, users who are human annotators can identify or label artifacts that are present in the generated motions 120. Example types of artifacts include foot skating, floating, ground penetration, and so on. The label or text description of motion artifacts allow the use of negative prompts during inference to remove artifacts from the generated motions 120.

That is, users who are human editors can provide commands and user inputs to adjust, modify, correct, or directly fix some artifacts in the generated motions 120 or the video reconstruction data 104 reconstructed from video data, through simple motion editing interfaces of suitable applications and software. For example, the motion editing interfaces can allow a user to change attributes of a body part or a joint of a human character, including one or more of a position of the body part or the joint, orientation of the body part or the joint, dimensions of the body part or the joint, rotation in terms of angles of the body part or the joint, velocity of the body part or the joint, acceleration of the body part or the joint, spatial relationship between two or more body parts/joints (the character's hands are in contact with one another), and so on. Such attributes include the parameters defined in expressions (1) and (2). For example, the editing interface allows the user to move a position and rotation of two joints in a leg of a human character to correct a skating artifacts in a number of frames of the generated motions 120 or the video reconstruction data 104.

Figure 2:
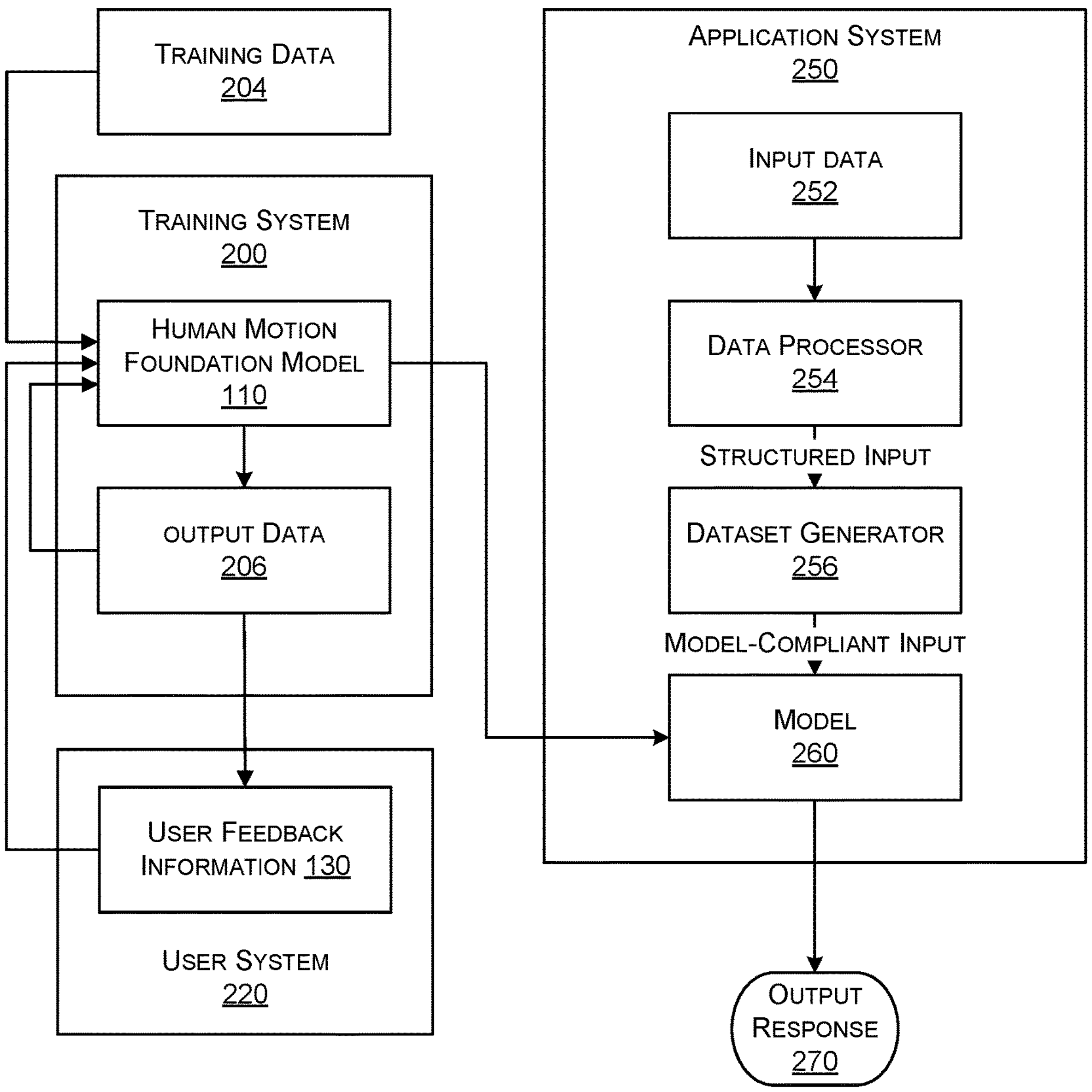
FIG. 2 illustrates an example computing environment including a training system for training a human motion foundation model and an application system for deploying the human motion foundation model, in accordance with some embodiments of the present disclosure.

FIG. 2 illustrates an example computing environment including a training system 200 and an application system 250 for training and deploying machine learning models, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The training system 200 can train or update the human motion foundation model 110. In some embodiments, the human motion foundation model 110 includes one or more diffusion models (e.g., Denoising Diffusion Probabilistic Models (DDPMs)). The human motion foundation model 110 can include one or more neural networks. A neural network can include an input layer, an output layer, and/or one or more intermediate layers, such as hidden layers, which can each have one or more respective nodes. The human motion foundation model 110 can include one or more convolutional neural networks (CNNs), one or more residual neural networks (ResNets), other network types, or various combinations thereof. The human motion foundation model 110 and the components thereof can include at least one generative model, which can include a statistical model that can generate new instances of data (e.g., new, artificial, synthetic data such as artificial, synthesized, or synthetic generated motion 120) using existing data (e.g., the mocap data 102, the video reconstruction data 104, and so on). The new instances of data is referred to as output data 206.

The training system 200 can train (e.g., update) the human motion foundation model 110 by applying as input the training data 204. The training data 204 can include one or more of the mocap data 102 and the video reconstruction data 104. In some examples, the training data 204 can also include text prompts. The human motion foundation model 110 (e.g., the generative model) is trained or updated using the training data 204 to allow the human motion foundation model 110 to output the output data 206 (e.g., the generated motion 120).

The output data 206 can be used to evaluate whether the human motion foundation model 110 has been trained/updated sufficiently to satisfy a target performance metric, such as a metric indicative of accuracy of the human motion foundation model 110 in generating outputs. In some examples, the output data 206 can be provided, via a suitable network or connection, to a user system 220 operated by a user. The user system 220 can include suitable display capabilities to render the output data 206 and display the rendered video or animation on a display for the user. The user can provide the user feedback information 130 using the user system 220 (e.g., an Input/Output (I/O) component thereof). The user system 220 can provide the user feedback information 130 back to the training system 200 (e.g., back to the human motion foundation model 110) via the network to update the human motion foundation model 110. The user system 220 can be implemented by or communicatively coupled with the training system 200 via a suitable network.

For example, the training system 200 can use a loss function (e.g., the ranking loss) to evaluate a condition for determining whether the human motion foundation model 110 is configured (sufficiently) to meet the target performance metric and/or to update the human motion foundation model 110, for example, according to RLHF. The condition can be a convergence condition, such as a condition that is satisfied responsive to factors such as an output of the function meeting the target performance metric or threshold, a number of training iterations, training of the human motion foundation model 110 converging, or various combinations thereof. For example, the function can be of the form of a mean error, mean squared error, or mean absolute error function to minimize the ranking loss.

The training system 200 can iteratively apply the training data 204 to update the human motion foundation model 110, receive the feedback information 130 from the user system 220, evaluate the loss responsive to applying the training data 204, and modify (e.g., update one or more weights and biases of) the human motion foundation model 110. The training system 200 can modify the human motion foundation model 110 by modifying at least one of a weight or a parameter of the human motion foundation model 110. The training system 200 can evaluate the function by comparing an output of the function to a threshold of a convergence condition, such as a minimum or minimized cost threshold, such that the human motion foundation model 110 is determined to be sufficiently trained (e.g., sufficiently accurate in generating outputs) responsive to the output of the function being less than the threshold. The training system 200 can output the human motion foundation model 110 responsive to the convergence condition being satisfied.

The application system 250 can operate or deploy a model 260 to generate the output response 270 to input data 252. Examples of the input data 252 include text prompts, flexible kinematic constraints, and so on. A user can provide the input data 252 using any suitable I/O component of the application system 250 or a user system which provides the input data 252 to the application system 250 via a suitable network. The input data 252 can condition the model 260 to generate the output response 270. In general, the input data 252 can directly (e.g., by providing explicit values such as through the kinematic constraints) or indirectly (e.g., by providing natural language such as text prompts) set the value of one or more parameters in the vectors in expressions (1) and (2). The input data 252 can further include, explicitly or implicitly, a time, time step, or a frame number by which the specified parameter is to be applied. For example, the user can indicate that a human character having a state defined using at least one specified parameter in the vectors in expressions (1) and (2) is applicable 4 seconds into the generated motion of the output response 270.

The text prompts includes text commands that can describe, directly or indirectly, a type of motions, behaviors, activities, tasks, or actions that a human character can perform. For example, a text prompt can include a natural language command that describes one or more common behaviors, compositional behaviors, or domain-specific behaviors.

The models 110 and 260 are multi-modal as they can accept other types of the input data 252 such as kinematic constraints. The kinematic constraints can be flexible and general—a user can specify any component of human motion as a kinematic constraint, examples of which include a keyframe in a motion (spanning multiple frames) of a human character, a path or target trajectory to be followed by a human character, attributes of one or more body parts of joints of a human character, and so on. For example, the user can indicate a kinematic constraint for an attribute by specifying a value for a parameter in the vectors in expressions (1) and (2).

A keyframe can include a frame or a time step in a kinematic model. The keyframe can be defined by an attribute of each of at least one body part/joint of a human character (e.g., a skeleton), or alternatively attributes of all body parts/joints of that human character. For example, the user can indicate an attribute by specifying a value for a parameter in the vectors in expressions (1) and (2). The output response 270 includes the human motion data of the keyframe, infilled frames before and/or after the keyframe, infilled frames between two keyframes if two keyframes are specified, and so on. The output response 270 can also include other attributes in the keyframe not specified in input data 252.

A path or target trajectory can be defined by a sequence of waypoints over a period of time, each of which is defined by a set of coordinates in a coordinate system. For example, the user can indicate the path or trajectory by specifying a value for a parameter indicating velocity position, and heading in the vectors in expressions (1) and (2). The output response 270 can include the human motion data corresponding to a human character following the path or trajectory, and also in some examples human motion data corresponding to the human character before a starting point in the path and/or after an end point in the path.

An attribute of a body part or a joint of a human character includes one or more of a position of the body part/joint, orientation of the body part/joint, dimensions of the body part/joint, rotation in terms of angles of the body part/joint, velocity of the body part/joint, acceleration of the body part/joint, spatial relationship between two or more body parts/joints (the character's hands are in contact with one another), and so on. For example, the user can indicate an attribute by specifying a value for a parameter in the vectors in expressions (1) and (2). The frame corresponding to the attribute can be a frame or time step specified by the user or some arbitrary frame or time step. The output response 270 includes the human motion data for the specified attribute of the body part/joint and/or attributes of other body parts/joints of the human character not specified in input data 252.

The application system 250 can be a system to provide outputs (e.g., the output response 270) based on the input data 252. The application system 250 can be implemented by or communicatively coupled with the training system 200 via a suitable network.

The model 260 can be or be received as the human motion foundation model 110, a portion thereof, or a representation thereof. For example, a data structure representing the human motion foundation model 110 can be used by the application system 250 as the model 260. The data structure can represent parameters of the trained human motion foundation model 110, such as weights or biases used to configure the model 260 based on the training of the human motion foundation model 110.

The data processor 254 can be or include any function, operation, routine, logic, or instructions to perform functions such as processing the input data 252 to generate a structured input, such as a structured language data structure. In some examples, the data processor 254 includes an LLM that can receive a text prompt in natural language such as "a person is walking in circles" and outputs text embeddings or a sequence of tokens corresponding to the text prompt in response. Such text embeddings and tokens can be mapped to one or more parameters in expressions (1) and/or (2) to define some aspects of the local pose or the global pose. In other words, the data processor 254 can map text prompts into values for the parameters in expressions (1) and (2). Such an LLM (or LLMs) can also be present in the training system 200 to provide such mapping for training the human motion foundation model 110. The LLM and the motion imitation controller 106 can be trained as part of the human motion foundation model 110, e.g., using the same loss functions. The data processor 254 can provide the structured input (e.g., the values for the parameters in expressions (1) and (2)) to a dataset generator 256.

The dataset generator 256 can be or include any function, operation, routine, logic, or instructions to perform functions such as generating, based at least on the structured input, an input compliant with the model 260. For example, the model 260 can be structured to receive input in a particular format, such as a particular text format, values for the parameters in expressions (1) and (2), natural language formal, or file type, which may be expected to include certain types of values. The particular format can include a format that is the same or analogous to a format by which the training data 204 is applied to the human motion foundation model 110 to train the human motion foundation model 110. The dataset generator 256 can identify the particular format of the model 260, and can convert the structured input to the particular format.

The data processor 254 and the dataset generator 256 can be implemented as discrete functions or in an integrated function. For example, a single functional processing unit can receive the text prompts and kinematic constraints and can generate the input to provide to the model 260 responsive to receiving the text prompts and kinematic constraints.

The model 260 can generate an output response 270 responsive to receiving the model-compliant input from the dataset generator 256. The output response 270 can be in a suitable motion and/or gesture file format that presents an animation or movement of a human character in a kinematic model, planar models, or volumetric model through space defined by a coordinate system and over a period of time. The output response 270 can be rendered by a suitable graphical processor to be displayed on a display screen as animation, video, and so on. Through rendering, surfaces and textual for the human characters can be added.

Figure 3:
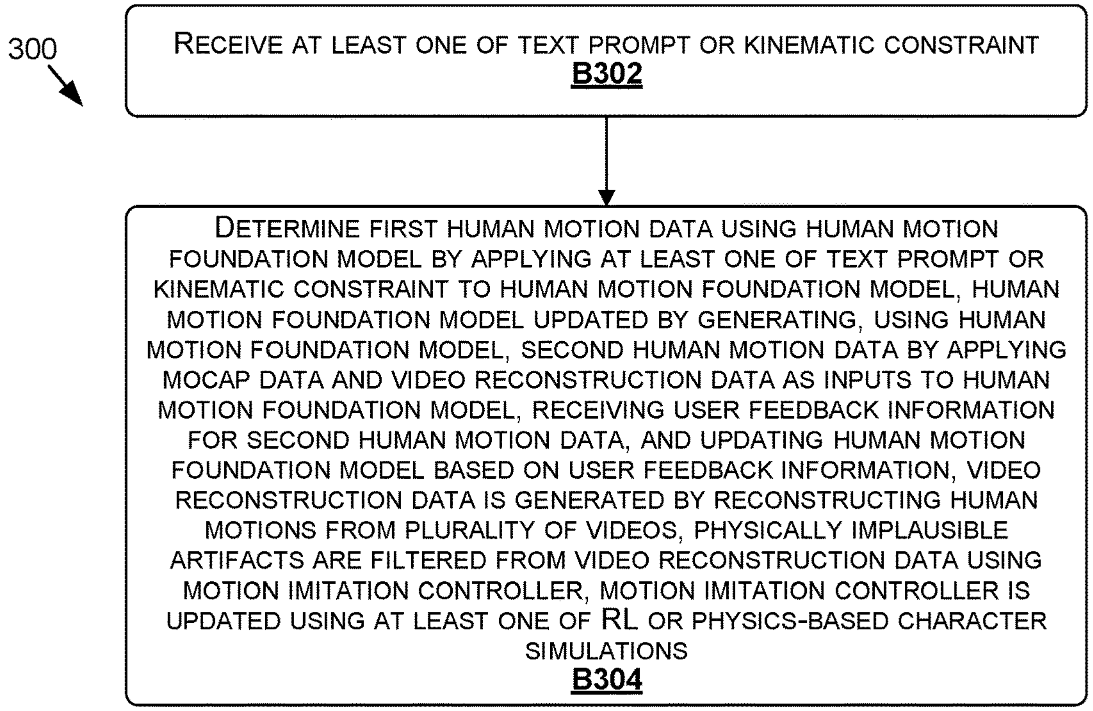
FIG. 3 is a method for generating human motion data using a human motion foundation model, in accordance with some embodiments of the present disclosure.

FIG. 3 is a method 300 for generating human motion data using a human motion foundation model 110/260, according to some embodiments. For instance, various functions can be carried out by at least one processor executing instructions stored in at least one memory. The method 300 can be embodied as computer-usable instructions stored on one or more computer storage media. The method 300 may be provided by a standalone application, a service or hosted service (standalone or in combination with another hosted service), or a plug-in to another product, to name a few. In addition, method 300 is described, by way of example, with respect to the systems of FIG. 1 and FIG. 2. However, this method 300 may additionally or alternatively be executed by any one system, or any combination of systems, including, but not limited to, those described herein.

At B302, the application system 250 receives at least one of a text prompt or a kinematic constraint. For example, the input data 252 can include the text prompt or a kinematic constraint. In some embodiments, the kinematic constraint includes at least one of a keyframe of a human character, a path or target trajectory to be followed by the human character, or attributes of one or more body parts or joints of the human character. The attributes of the one or more body parts or joints include at least one of a position of the one or more body parts or joints, an orientation of the one or more body parts or joints, dimensions of the one or more body parts or joints, rotation of the one or more body parts or joints, velocity of the one or more body parts or joints, acceleration of the one or more body parts or joints, or a spatial relationship between two or more body parts or joints.

At B304, the model 110/260 determines first human motion data by applying the at least one of the text prompt, the kinematic constraint, or a collision avoidance constraint to the model 110/260. For example, the generated motion 120 can satisfy the text prompt and the kinematic constraint while avoiding objects specified in the collision avoidance constraint. The output response 270 includes the first human motion data. The model 110 is updated by generating, using the human motion foundation model 110, second human motion data (e.g., the generated motion 120) by applying the mocap data 102 and the video reconstruction data 104 as inputs to the model 110, receiving the user feedback information 130 for the human motion data, and updating the model 110 based on the user feedback information 130.

The video reconstruction data 104 is generated by reconstructing human motions or human motion data from a plurality of videos. In some examples, physically implausible artifacts are filtered from the video reconstruction data 104 using the motion imitation controller 106. The motion imitation controller 106 is updated using at least one of RL or physics-based character simulations.

In some examples, as described in further details herein, the model 110/260 includes a first model and a second model. Each of the first model and the second model is a diffusion model. The first model is configured to generate a global root motion. The second model is configured to generate a local joint motion. The first human motion data (e.g., the output response 270) includes the global root motion and the local joint motion. The second human motion data (e.g., the generated motion 120) includes the global root motion and the local joint motion.

Figure 4:
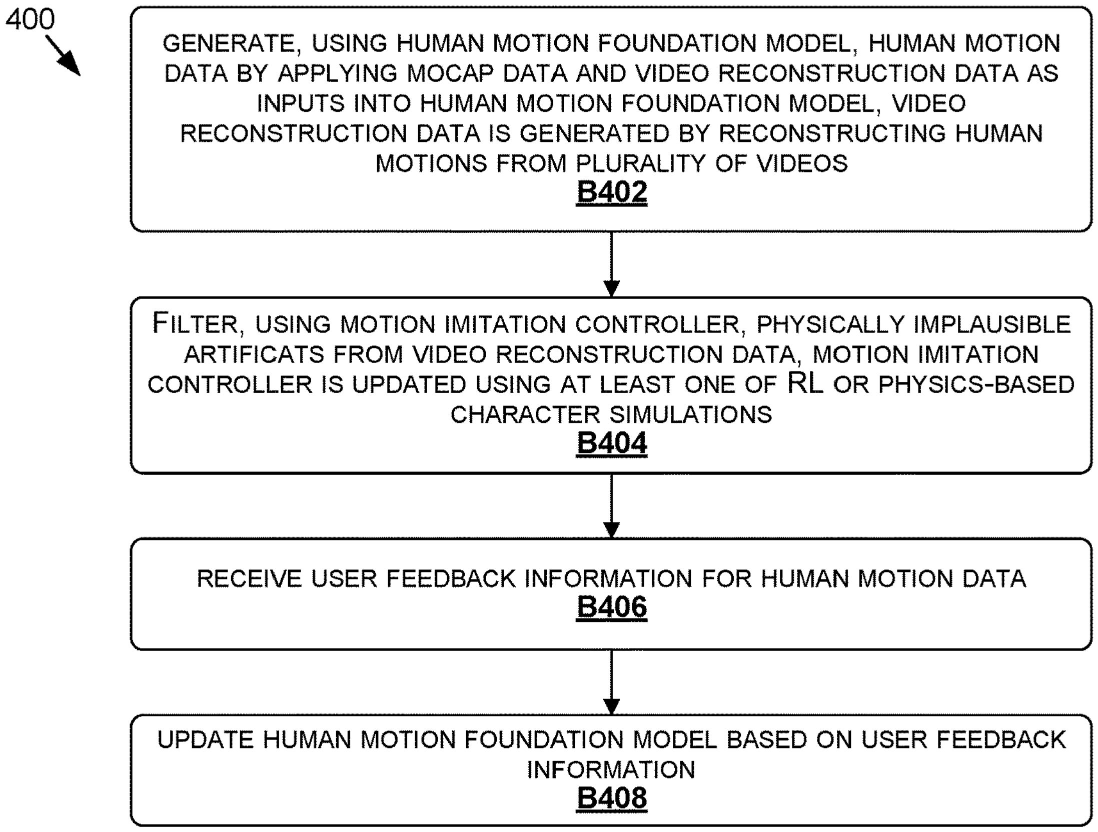
FIG. 4 is a method for updating a human motion foundation model to generate human motion data, in accordance with some embodiments of the present disclosure.

FIG. 4 is a method 400 for training (e.g., updating) a human motion foundation model 110/260 to generate human motion data, according to some embodiments. For instance, various functions can be carried out by at least one processor executing instructions stored in at least one memory. The method 400 can be embodied as computer-usable instructions stored on one or more computer storage media. The method 400 may be provided by a standalone application, a service or hosted service (standalone or in combination with another hosted service), or a plug-in to another product, to name a few. In addition, method 400 is described, by way of example, with respect to the systems of FIG. 1 and FIG. 2. However, this method 400 may additionally or alternatively be executed by any one system, or any combination of systems, including, but not limited to, those described herein.

At B402, the model 110 generates human motion data (e.g., the generated motion 120) by applying the mocap data 102 and the video reconstruction data 104 as inputs into the model 110. The video reconstruction data 104 is generated by reconstructing human motions from a plurality of videos (e.g., the video data). In some examples, at B404, physically implausible artifacts are filtered from the video reconstruction data 104 using the motion imitation controller 106. The motion imitation controller 106 is updated using at least one of RL or physics-based character simulations.

In some examples the mocap data 102 corresponds to one or more of a pose, a common behavior, a compositional behavior including two or more common behaviors that are simultaneous or in sequence, or a domain-specific behavior for an application. In some examples, the video reconstruction data 104 has a text label or description. In other examples, the video reconstruction data 104 is unlabeled with any text label. In some examples, the video reconstruction data 104 is determined by applying video data as inputs into one or more pose estimation models. In some examples, at least one of the human motion data (e.g., the generated motion 120), the video reconstruction data 104, or the mocap data 102 includes at least one of a kinematic model, planar model, or volumetric model of a human character.

In some examples, the RL includes updating the motion imitation controller 106 to generate simulated human motion data that imitates the human motion data. In some examples, the human motion data includes motion data for a first behavior followed temporally by motion data for a second behavior. The physics-based character simulations generate motion data for a transition between the first behavior and the second behavior.

At B406, the model 110 receives user feedback information 130 for the human motion data. At B408, the training system 200 updates the model 110 based on the user feedback information 130.

In some examples, the user feedback information 130 includes a score that rates relevance of the human motion data to a text prompt. In some examples, the human motion data includes a plurality of candidate generated motions. The user feedback information 130 includes a candidate generated motion of the plurality of candidate generated motions selected by a user or a ranking of the plurality of candidate generated motions determined by the user. The model 110 is updated using a ranking loss corresponding to the selected candidate generated motion or the ranking. In some examples, the user feedback information 130 includes at least one of labels or text descriptions for the human motion data that describe types of the human motion data or artifacts in the human motion data. In some examples, the user feedback information 130 includes user input to correct artifacts in the human motion data or the video reconstruction data 104.

Figure 5:
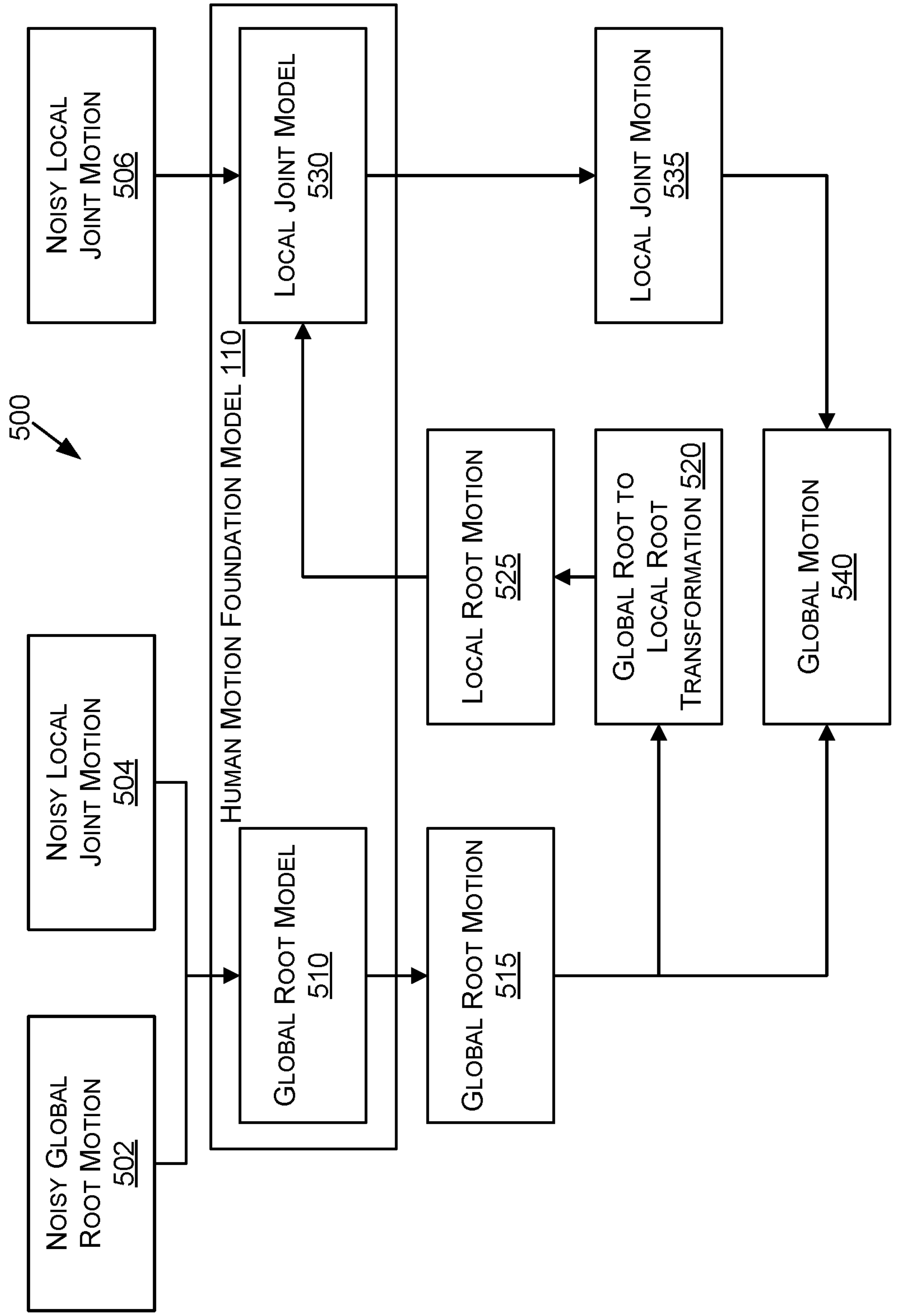
FIG. 5 is a diagram illustrating a two-stage interleaved diffusion process performed by a human motion foundation model, in accordance with some embodiments of the present disclosure.

FIG. 5 is a diagram illustrating a two-stage interleaved diffusion process 500 performed by the human motion foundation model 110, according to various embodiments.

The two-stage interleaved diffusion process 500 illustrates one iteration of a denoising step. The two-stage interleaved diffusion process 500 can be implemented for any (e.g., each) diffusion step, any (e.g., each) denoising step, or any (e.g., each) iteration of the diffusion process. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

As shown in FIG. 5, the human motion foundation model 110 can include a global root model 510 (e.g., a first diffusion model) and a local joint model 530 (e.g., a second diffusion model). In a first stage, the global root model 510 predicts global root motion 515 of a root of a human character. In a second stage, the local joint model 530 predicts the local joint motion 535 of the human character. The combination of the global root motion 515 and the local joint motion 535 is referred to as the global motion 540 (e.g., the global pose). The two-stage interleaved diffusion process 500 is applied for each diffusion step. For example, for each diffusion step or iteration in the diffusion process, in the second stage, the local joint motion 535 is generated to match the global root motion 515.

In some arrangements, a difference between two consecutive denoising steps is the noise applied to the motion. For example, at each denoising step, random noise is added to the motion, and the noisy motion is run through the denoising model to remove the noise and produce a clean motion. This process is then repeated at the next step in which additional random noise is added and then removed in a similar manner. The amount of noise decreases at each step. At the last step, almost no noise is applied to the motion. In the two-stage interleaved model, the noisy global root motion 502 is denoised, and the local joint model 530 is conditioned on the cleaned global root motion 515 when denoising the noisy local joint motion 506. This allows the local joint motion 535 to be better aligned with the global root motion 515. In some arrangements, a single denoising step (step t) includes 1) taking in a noisy motion, 2) predicting, by the model, a clean motion based on the noisy motion, 3) and adding noise back to the clean motion which becomes the noisy input motion at the next step t−1. The noise added in step (3) is slightly less than the noise present in the input in step (1). The denoising step can be performed iteratively until the last denoising step in which no or very little noise is added back at step (3). The interleaving as described herein can be performed within every denoising step by both the global root model 510 and the local joint model 530 to predict a clean global motion 540. In conventional denoising mechanisms, the entire denoising process (e.g., a large number of 1000 denoising steps) is run with only the global root model 510 first, then the entire denoising process (e.g., another large number denoising steps) is run with the local joint model 530. In the arrangements disclosed herein, the local joint model 530 is conditioned on the prediction from the global root model 510 within every denoising step. Even if the local and global motions do not align perfectly in one step, they can be corrected in subsequent steps which take in the previous predicted motions as input. Such iterative nature can slowly refine and align the global and local predictions.

In some embodiments, each of the global root model 510 and the local joint model 530 can include a generative model, which can include a statistical model that can generate new instances of data (e.g., new, artificial, synthetic data such as the global root motion 515 and the local joint motion 535) using existing data (e.g., the mocap data 102, the video reconstruction data 104, and so on).

As compared to processes where the global root motions are first determined through all diffusion steps, denoising steps, or iterations of the diffusion process before the local joint motions are determined, this two two-stage interleaved diffusion process 500 can improve performance and also enables simpler integration of kinematic constraints, such as keyframes and target waypoints, without requiring additional computation and storage capacities in running the diffusion method. For example, constraints such as the text prompts and the kinematic constraints can be more easily specified by a user and effectively implemented in a global pose as compared to a local pose. That is, the human motion foundation model 110 can be more easily and efficiently trained to enforce constraints specified by a user in the global coordinate system or frame, with mapping to a local coordinate system and frame via the transformation 520.

In some embodiments, motion data of a human character can be defined using a local pose and a global pose. A local pose of a human character at a moment in time can be defined using a set of parameters such as a vector:

$$\text{Local Pose} = [r_\theta^v, r_x^v, r_z^v, r_y^p, j^p, j^v, j^\theta, c_p]; \tag{1}$$

where $$r_\theta^v$$

is a one-dimension angular velocity of the human character, $$r_x^v \text{ and } r_z^v$$

are linear velocities of the human character in the x and z directions respectively, $$r_y^p$$

is the height of the human character in the y direction, $j^p$ is a position of each joint of the human character, $j^v$ is a velocity of each joint of the human character, $j^\theta$ is a rotation of each joint of the human character, and $c_p$ is a foot contact of the human character.

In some examples, a vector $$[r_\theta^v, r_x^v, r_z^v, r_y^p]$$

define a local root motion of a human character. That is, the local root motion of the human character is defined by or includes at least one of a one-dimensional velocity, a linear velocity, or a height of the human character. In some examples, a vector $[j^p, j^v, j^\theta]$ define a local joint motion. That is, the local joint motion of the human character is defined by or includes at least one of a position of each of one or more joints of the human character, a velocity of each of one or more joints of the human character, or a rotation of each of one or more joints of the human character. All parameters and information defining the local pose can be defined with respect to or in a local coordinate system or frame of the root. At t=0, the human character is located at the origin of the local coordinate frame facing a direction defined by the positive z axis (e.g., +z direction).

In some embodiments, a global pose (or global motion) of a human character at a moment in time can be defined using a set of parameters such as a vector:

$$\text{Global Pose} = [r_x^p, r_y^p, r_z^p, r_x^h, r_z^h, j^p, j^v, j^\theta, c_f]; \quad (2)$$

where $$r_x^p, r_y^p, r_z^p$$

define a position (e.g., a global position) of the human character in the x, y, and z directions respectively, $$r_x^h, r_z^h$$

defines a heading (e.g., a global heading) of the human character in the x and z direction, $j^p$ is a position of each joint of the human character, $j^v$ is a velocity of each joint of the human character, $j^\theta$ is a rotation of each joint of the human character, and $c_f$ is a foot contact of the human character.

In some examples, the combination of the position and heading of the human character, e.g., a vector $$[r_x^p, r_y^p, r_z^p, r_x^h, r_z^h]$$

define a global root motion of a human character. That is, the global root motion of the human character is defined by or includes at least one of a global position of the human character in the x, y, and z directions and a global heading of the human character in the x and z direction. In some examples, the global position of the human character corresponds to a point on a pelvis (or another suitable body part or joint) of the human character. In some examples, a vector $[j^p, j^v, j^\theta]$ defines the local joint motion. The local joint motion of the human character is defined by or includes at least one of a position of one or more (e.g., each) joints of the human character, a velocity of one or more (e.g., each) joints of the human character, or a rotation of one or more (e.g., each) joints of the human character. The parameters and information defining the global root motion can be defined with respect to or in a global coordinate system or frame, whereas the parameters and information defining the local joint motion can be defined with respect to or in a local coordinate frame of the root.

In some examples, random noise including a noisy global root motion 502 and a noisy local joint motion 504 can be applied as inputs into the global root model 510. In some examples, the noisy global root motion 502 can be defined using a vector $$[r_x^p, r_y^p, r_z^p, r_x^h, r_z^h],$$

each parameter of which can be a noisy value. The noisy local joint motion 504 can be defined using a vector $[j^p, j^v, j^\theta]$ or $[j^p, j^v, j^\theta, c_f]$ (with foot contact), any (e.g., each) parameter of which can be a noisy value. Through a diffusion process, the global root model 510 outputs a global root motion 515, which can be defined using a vector $$[r_x^p, r_y^p, r_z^p, r_x^h, r_z^h],$$

each parameter of which can be a clean value. In some examples, the global root model 510 denoises the noisy global root motion 502 and the noisy local joint motion 504 to obtain the global root motion 515.

The global root motion 515 is provided as the input to a global root to local root transformation function 520, which outputs a corresponding local root motion 525. In some examples, the local root motion 525 can be defined using a vector $$[r_\theta^v, r_x^v, r_z^v, r_y^p].$$

The global root to local root transformation function 520 can include any suitable mapping function that maps parameters of the global root motion 515 in the global coordinate frame to parameters of the local root motion 525 in the local coordinate frame.

The local root motion 525 and random noise including a noisy local joint motion 506 can be applied as inputs into the local joint model 530. In some examples, the noisy local joint motion 506 is the same as the noisy local joint motion 504. In some examples, the noisy local joint motion 506 is different from the noisy local joint motion 504. In some examples, the noisy local joint motion 506 can be defined using a vector $[j^p, j^v, j^\theta]$ or $[j^p, j^v, j^\theta, c_f]$ (with foot contact), each parameter of which can be a noisy value. Through a diffusion process, the local joint model 530 outputs a location joint motion 535, which can be defined using a vector $[j^p, j^v, j^\theta]$ or $[j^p, j^v, j^\theta, c_f]$ (with foot contact), each parameter of which can be a clean value. In some examples, the location joint motion 535 denoises the noisy local joint motion 506 to obtain the location joint motion 535. The combination of the global root motion 515 and the location joint motion 535 is the global motion 540 (e.g., global pose), as defined using expression (2). In some examples, the global root motion 515 is an example of the generated motion 120, the output data 206, and the output response 270.

In some embodiments, the process 500 intends to denoise the noisy inputs 502, 504, and 506 to produce realistic human motion while meeting constraints corresponding to text prompt or a kinematic constraint, specified as part of the input data 252. In some examples, the text prompts and kinematic constraints can be included as part of the process 500 by replacing one or more noisy parameters in the noisy inputs 502, 504, and 506 with values corresponding to the text prompts and kinematic constraints.

For a next diffusion step, denoising step, or iteration, the alignment of the local joint motion 535 to the global root motion 515 can be improved or corrected, as the process 500 is being executed again for the next diffusion step, denoising step, or iteration. In some examples, a text prompt (e.g., in natural language such as "a person is walking in circles") can be applied as an input to an LLM, which outputs text embeddings or a sequence of tokens corresponding to the text prompt in response. Such text embeddings and tokens can be mapped to one or more parameters in expressions (1) and/or (2) to define some aspects of the local pose or the global pose.

Kinematic constraints such as keyframes, paths or target trajectories, and attributes can be specified by a user by providing a value for the one or more parameters in expressions (1) and/or (2) to define some aspects of the local pose or the global pose of a human character. The specified value can overwrite and replace another value (e.g., a noisy value) for that parameter. A mask can be added the specified value to indicate to the human motion foundation model 110 (e.g., to the global root model 510 and the local joint model 530) that the specified value is provided by a user and should be met as a constraint. For example, a keyframe or an attribute can be specified by a user via providing a value for one or more parameters in expressions (1) and/or (2). A path or target trajectory can be specified by a user via providing a value for one or more parameters:

$$r_\theta^v$$

(one-dimension angular velocity), $$r_x^v \text{ and } r_z^v$$

(linear velocity), $$r_x^h, r_z^h$$

(global heading), and so on. By specifying such parameters, the user can set aspects the human character at a moment in time (e.g., at a time step), such that the generated motion 120, the output response 270, and the global motion 540, which can be defined by additional parameters not specified by the user for that time step or for other time steps before and after that time step, meet those parameters. In other words, the generated motion 120, the output response 270, and the global motion 540 are defined by a first parameters specified by the user in a first time steps and a second parameters generated using the human motion foundation model 110 in the first time steps and/or second time steps, where the second parameters are generated according to the constraints corresponding to the first parameters. The avoidance constraint can include 3D objects, and the generated motion 120 are generated to avoid those objects.

In some examples, a guidance loss $\mathcal{J}(\tau^0)$ can be determined to update the local joint model 530 to provide test time guidance, to influence the local joint model 530 to generate local joint motion 535 that would adhere to or meet the constraints such as the text prompt or the kinematic constraints. In some examples, the guidance loss can also be applied to the global root motion 515 to affect the output of the global root model 510. The guidance loss can be performed at each denoising step. For example, a guidance loss (e.g., a score) can be calculated for the local joint motion 535 that indicates a degree to which the local joint motion 535 matches the constraints. In an example in which the constraint indicates a body part (e.g., a wrist) of a human character to be at a specified position at a time step, the guidance loss can be determined according to a Euclidean distance between the specified position and an actual position of that body part at the time step. The local joint model 530 can be updated according to the guidance loss. In some examples, the guidance loss $\mathcal{J}(\tau^0)$ can be implemented to update the local joint model 530 according to:

$$\tilde{\tau}^0 = \hat{\tau}^0 + \alpha \nabla_{\tau^k} \mathcal{J}(\hat{\tau}^0), \tag{3}$$

where $\tilde{\tau}^0$ is the updated clean local joint motion 535. Noise can be added to the clean local joint motion 535 for a next iteration or step of the diffusion process, where it becomes the noisy local joint motion 506. In some examples, $\hat{\tau}^0$ is the predicted results (e.g., the local joint motion 535) corresponding to $\hat{\tau}^0$, and $\mathcal{J}(\hat{\tau}^0)$ is the guidance loss on the local joint motion 535. The local joint model 530 is updated based on the guidance loss $\mathcal{J}(\tau^0)$. For example, the gradient of the guidance loss is added to the initial motion prediction $\hat{\tau}^0$. The guidance loss can be considered or implemented as a reward function. The gradient of the guidance loss is determined with respect to the input motion $\tau^k$. The gradient is adjusted according to a guidance weight α and added back to the local joint motion 535. The local joint model 530 can be updated to maximize the reward according to expression (3).

Figure 6:
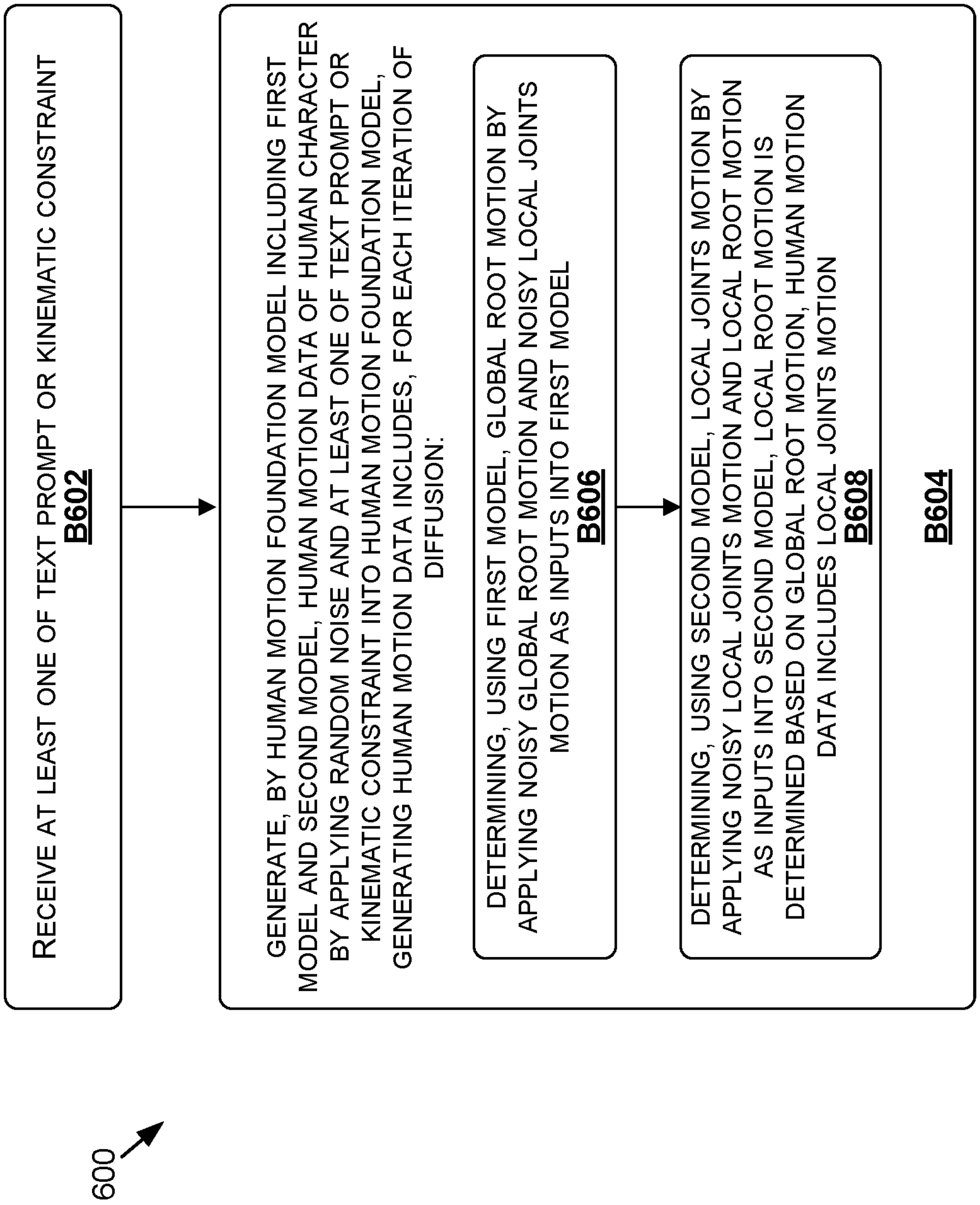
FIG. 6 is a method for generating human motion data using a human motion foundation model, in accordance with some embodiments of the present disclosure.

FIG. 6 is a method 600 for generating human motion data using a human motion foundation model 110/260, according to some embodiments. For instance, various functions can be carried out by at least one processor executing instructions stored in at least one memory. The method 600 can be embodied as computer-usable instructions stored on one or more computer storage media. The method 600 may be provided by a standalone application, a service or hosted service (standalone or in combination with another hosted service), or a plug-in to another product, to name a few. In addition, method 600 is described, by way of example, with respect to the systems of FIGS. 1, 2, and 5. However, this method 600 may additionally or alternatively be executed by any one system, or any combination of systems, including, but not limited to, those described herein. In some examples, the method 600 is performed for each of a plurality of iterations of a diffusion process.

At B602, the application system 250 receives at least one of a text prompt or a kinematic constraint. For example, the input data 252 can include the text prompt or a kinematic constraint. In some embodiments, the kinematic constraint includes at least one of a keyframe of a human character, a path or target trajectory to be followed by the human character, or attributes of one or more body parts or joints of the human character. The attributes of the one or more body parts or joints include at least one of a position of the one or more body parts or joints, an orientation of the one or more body parts or joints, dimensions of the one or more body parts or joints, rotation of the one or more body parts or joints, velocity of the one or more body parts or joints, acceleration of the one or more body parts or joints, or a spatial relationship between two or more body parts or joints.

At B604, the model 260, which includes the first model (e.g., the global root model 510) and a second model (e.g., the local joint model 530), human motion data (e.g., the output response 270) of a human character by applying a random noise and the at least one of the text prompt or the kinematic constraint into the model 260. In some examples, the first model includes a first diffusion model, and the second model includes a second diffusion model.

In some examples, a value corresponding to the text prompt is set as a parameter in at least one of the noisy global root motion 502 or the noisy local joint motion 504, 506. In some examples, a value corresponding to kinematic constraint is set as a parameter in at least one of the noisy global root motion 502 or the noisy local joint motion 504/506. In some examples, the random noise is used to generate the noisy global root motion 502 and the noisy local joint motion 504/506. That is, the noisy global root motion 502 and the noisy local joint motion 504/506 are defined by random values for the parameters of the noisy global root motion 502 and the noisy local joint motion 504/506.

In some examples, generating the human motion data at B604 includes for each iteration of a diffusion process, determining, using the first model, global root motion 515 (e.g., predicted, clean global root motion) by applying noisy global root motion 502 and noisy local joint motion 504 as inputs into the first model at B606 and determining, using the second model, the local joint motion 535 (e.g., predicted, clean local joint motion) by applying the noisy local joint motion 506 and local root motion 525 as inputs into the second model at B608. The local root motion 525 is determined based on the global root motion 515. The human motion data includes the local joint motion 535 and the global root motion 515.

In some examples, the global root motion 515 is defined by at least one of the global position $$[r_x^p, r_y^p, r_z^p]$$

of the human character and the global heading $$[r_x^h, r_z^h]$$

of the human character. The global position and the global heading are defined with respect to a coordinate system of the global pose.

In some examples, the local joint motion 535 is defined by at least one of a position $j^p$ of a joint on the human character, a velocity $j^v$ of the joint of the human character, a rotation $j^\theta$ of the joint of the human character, or a local foot contact $c_p$ of the human character. The position, velocity, rotation, and local foot contact are defined with respect to a coordinate system of the local pose.

In some examples, the local root motion 525 is defined by at least one of a one-dimensional velocity $$r_\theta^v,$$

a linear velocity $$r_x^v, r_z^v,$$

or a height $$r_y^p$$

of the human character. The one-dimensional velocity, a linear velocity, and a height of the human character are defined with respect to a coordinate system of the local pose.

In some examples, the local root motion 525 is determined by the global root to local root transformation function 520 based on the global root motion 515 by transforming the global root motion 515 to the local root motion 525 according to mapping between a global coordinate frame to a local coordinate frame. The global root motion is defined in the global coordinate frame, and the local root motion is defined in the local coordinate frame.

In some examples, the human motion foundation model 101 is updated by applying the mocap data 102 and the video reconstruction data 104 as constraints to the human motion foundation model 101 to generate human motion data (e.g., the generated motion 120). The human motion foundation model 110 is updated using the user feedback information 130 for the human motion data.

In some examples, the user feedback information 130 includes a score that rates relevance of the human motion data to a text prompt. In some examples, the human motion data includes a plurality of candidate generated motions. The user feedback information 130 includes a candidate generated motion of the plurality of candidate generated motions selected by a user or a ranking of the plurality of candidate generated motions determined by the user. The human motion foundation model 110 is updated using a ranking loss corresponding to the selected candidate generated motion or the ranking. In some examples, the user feedback information 130 includes at least one of labels or text descriptions for the human motion data that describe types of the human motion data or artifacts in the human motion data. In some examples, the user feedback information 130 includes user input to correct artifacts in the human motion data or the video reconstruction data.

Accordingly, systems described with respect to FIGS. 1, 2, and 5 and the methods described with respect to FIGS. 3, 4, and 6 can be included in or provide data for a variety of different systems, downstream applications, and specialized domains for generating and consuming human motion data, such as automotive systems having control systems for an autonomous or semi-autonomous machine (e.g., an AI driver, an in-vehicle infotainment system, and so on) and/or a perception system (e.g., sensor systems and so on) for an autonomous or semi-autonomous machine, systems implemented using a robot, aerial systems, medical systems, boating systems, smart area monitoring systems, systems for performing deep learning operations, systems for performing simulation operations, systems for generating or presenting VR content, AR content, and/or MR content, systems for performing digital twin operations, systems implemented using an edge device, systems incorporating one or more VMs, systems for performing synthetic data generation operations, systems implemented at least partially in a data center, systems for performing conversational AI operations, systems for performing generative AI operations, systems implementing one or more language models—such as one or more LLMs, systems for hosting real-time streaming applications, systems for performing light transport simulation, systems for performing collaborative content creation for 3D assets, systems implemented at least partially using cloud computing resources, and/or other types of systems. The embodiments described herein can be adapted for specific computational platforms, enhancing algorithmic development for data-intensive tasks across diverse industries. Thus, the disclosed embodiments can integrate into diverse applications enabling refined analytical computation and improved accuracy.

Figure 7:
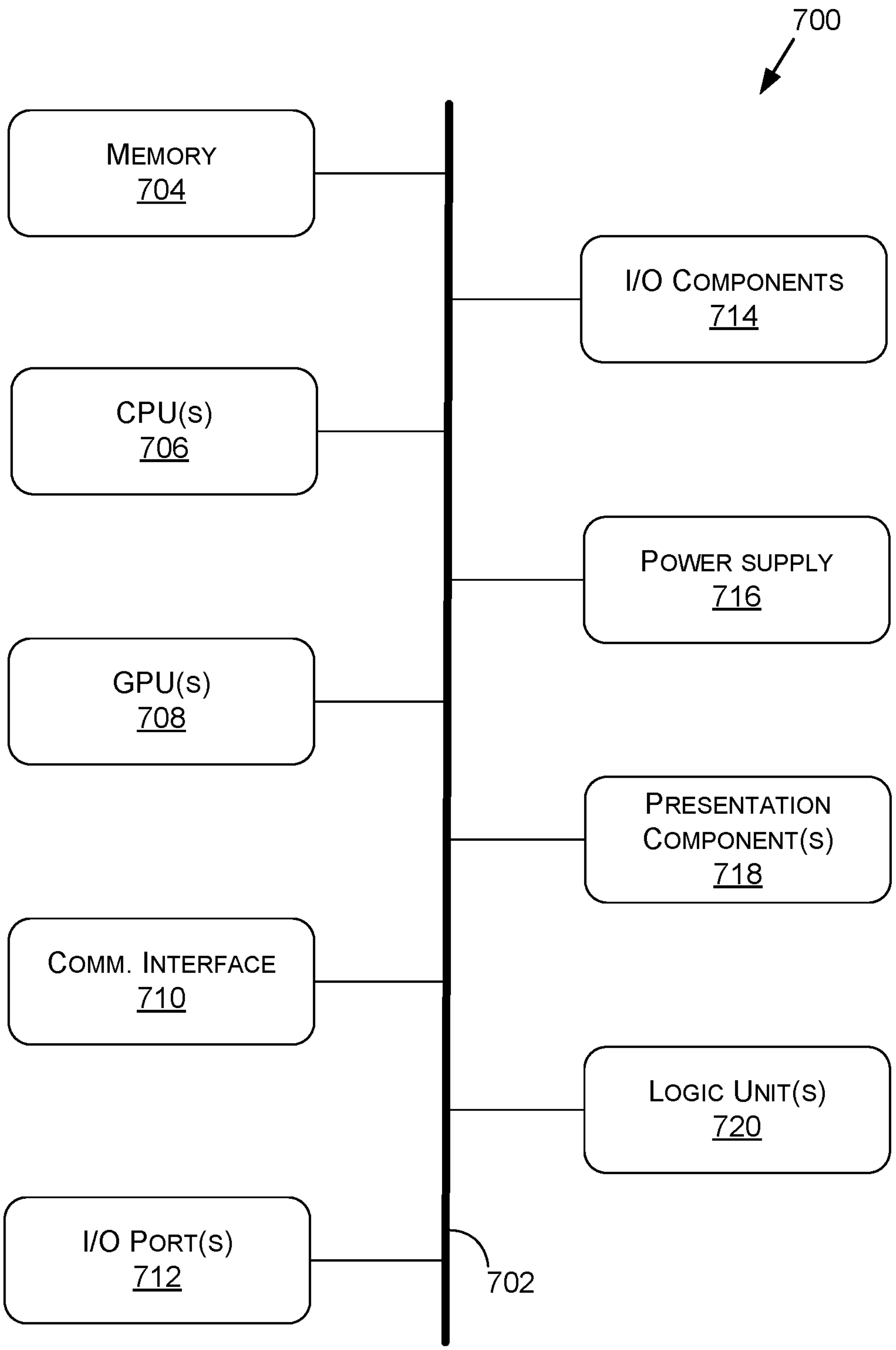
FIG. 7 is a block diagram of an example computing device(s) suitable for use in implementing some embodiments of the present disclosure.

FIG. 7 is a block diagram of an example computing device(s) 700 suitable for use in implementing some embodiments of the present disclosure. The computing device(s) 700 are example implementations of the training system 200, the application system 250, and can be used to perform the methods 100, 300, 400, and 600. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more VMs, and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708. Examples of the logic unit(s) 720 include the human motion foundation model 110/260, the motion imitation controller 106, the training system 200, the application system 250, the data processor 254, the dataset generator 256, the global root model 510, the local joint model 530, the global root to local root transformation function 520, and so on.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication 46nterfacee 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Figure 8:
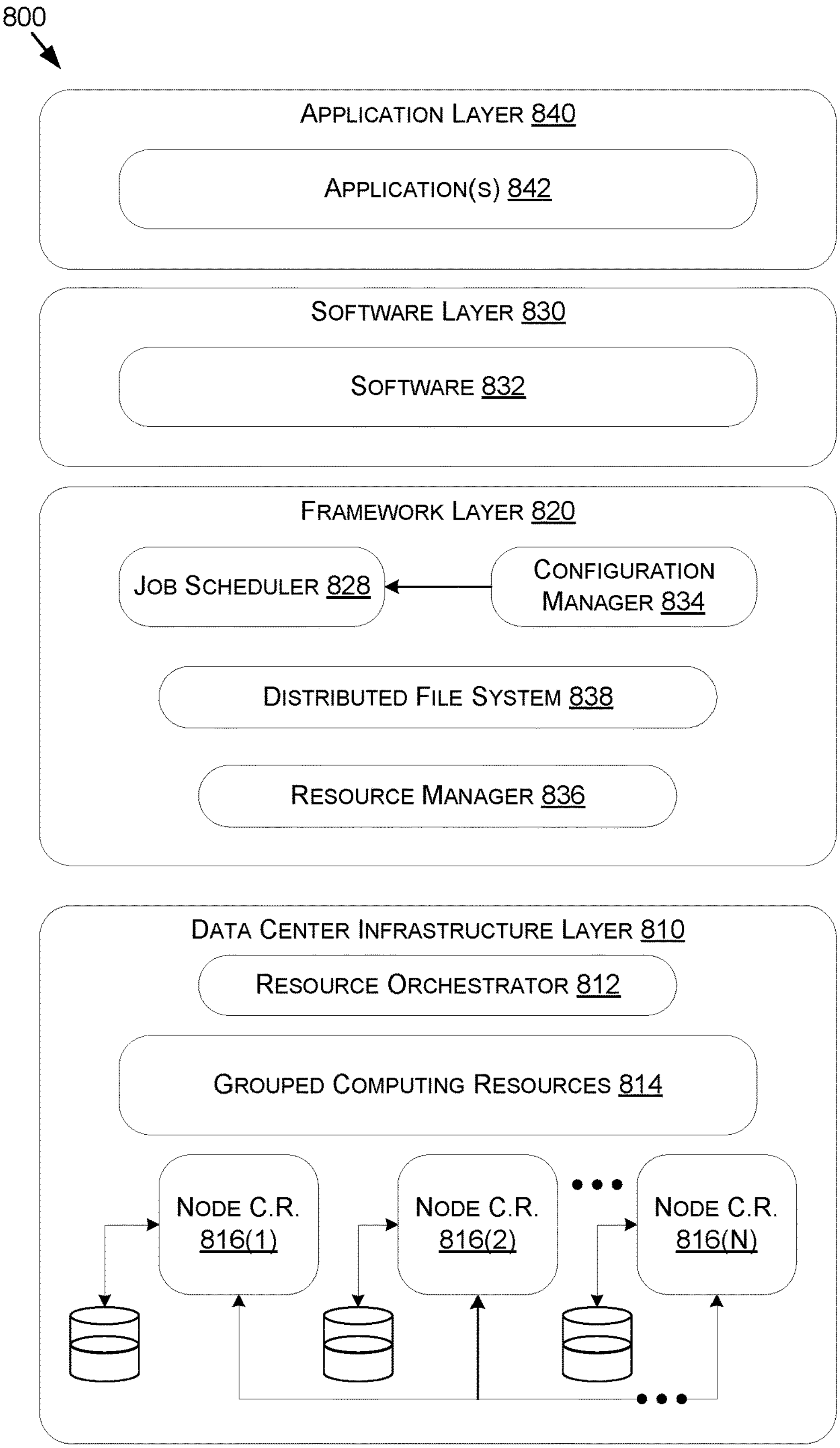
FIG. 8 illustrates an example data center that may be used in at least one embodiments of the present disclosure.

FIG. 8 illustrates an example data center 800 that may be used in at least one embodiments of the present disclosure, such as to implement the training system 200, the application system 250 and to perform the methods 100, 300, 400, and 600. The data center 800 may include a data center infrastructure layer 810, a framework layer 820, a software layer 830, and/or an application layer 840. 150

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or GPUs, etc.), memory devices (e.g., dynamic read-only memory), storage devices (e.g., solid state or disk drives), network input/output (NW I/O) devices, network switches, VMs, power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-816(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 828, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark (hereinafter “Spark”) that may utilize distributed file system 838 for large-scale data processing (e.g., “big data”). In at least one embodiment, job scheduler 828 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 828. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to perform training of the human motion foundation model 110 and/or operation of the model 260.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models (e.g., train the human motion foundation model 110) or predict or infer information using one or more machine learning models (e.g., the model 260) according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection including one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program including a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system including multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may include one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities can be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising one or more processors to:

receive at least one of a text prompt or a kinematic constraint;

generate, by a motion model comprising a first model and a second model, human motion data of a human character by applying a random noise and the at least one of the text prompt or the kinematic constraint into the motion model, generating the human motion data comprises, for each iteration of one or more interleaved diffusion iterations:

determining, using the first model in each iteration of the one or more interleaved diffusion iterations, global root motion by denoising noisy global root motion and noisy local joint motion applied as inputs into the first model in a first denoising step;

determining the local root motion based at least on the global root motion; and determining, using the second model in each iteration of the interleaved diffusion, local joint motion by applying the noisy local joint motion and local root motion as inputs into the second model and denoising the noisy local joint motion based at least on the local root motion in a second denoising step, the human motion data comprising the local joint motion and the global root motion.

2. The system of claim 1, wherein the kinematic constraint comprises at least one of: a keyframe of a human character, a path or target trajectory to be followed by the human character, or attributes of one or more body parts or joints of the human character, the attributes of the one or more body parts or joints comprise at least one of a position of the one or more body parts or joints, orientation of the one or more body parts or joints, dimensions of the one or more body parts or joints, rotation of the one or more body parts or joints, velocity of the one or more body parts or joints, acceleration of the one or more body parts or joints, or a spatial relationship between two or more body parts or joints.

3. The system of claim 1, wherein the global root motion is defined by at least one of a global position of the human character and global heading of the human character.

4. The system of claim 1, wherein the local joint motion is defined by at least one of a position of a joint on the human character, a velocity of the joint of the human character, a rotation of the joint of the human character, or a local foot contact of the human character.

5. The system of claim 1, wherein the local root motion is defined by at least one of a one-dimensional velocity, a linear velocity, or a height of the human character.

6. The system of claim 1, wherein the one or more processors to determine the local root motion based on the global root motion by transforming the global root motion to the local root motion according to mapping between a global coordinate frame to a local coordinate frame, the global root motion is defined in the global coordinate frame, and the local root motion is defined in the local coordinate frame.

7. The system of claim 1, wherein a value corresponding to the text prompt is set as a parameter in at least one of the noisy global root motion or the noisy local joint motion.

8. The system of claim 1, wherein a value corresponding to the kinematic constraint is set as a parameter in at least one of the noisy global root motion or the noisy local joint motion.

9. The system of claim 1, wherein the random noise is used to generate the noisy global root motion and the noisy local joint motion.

10. The system of claim 1, wherein the first model comprises a first diffusion model, and the second model comprises a second diffusion model.

11. The system of claim 1, wherein the motion model is updated by applying motion capture (mocap) data and video reconstruction data as constraints to the motion model to generate human motion data, and the motion model is updated using user feedback information for the human motion data.

12. The system of claim 11, wherein the user feedback information comprises a score that rates relevance of the human motion data to a text prompt.

13. The system of claim 11, wherein the human motion data comprises a plurality of candidate generated motions;

the user feedback information comprises a candidate generated motion of the plurality of candidate generated motions selected by a user or a ranking of the plurality of candidate generated motions determined by the user; and the motion model is updated using a ranking loss corresponding to the selected candidate generated motion or the ranking.

14. The system of claim 11, wherein the user feedback information comprises at least one of labels or text descriptions for the human motion data that describe types of the human motion data or artifacts in the human motion data.

15. The system of claim 11, wherein the user feedback information comprises user input to correct artifacts in the human motion data or the video reconstruction data.

16. The system of claim 1, wherein the system is comprised in at least one of:

a control system for an autonomous or semi-autonomous machine;

a perception system for an autonomous or semi-autonomous machine;

a system implemented using a robot;

an aerial system;

a medical system;

a boating system;

a smart area monitoring system;

a system for performing deep learning operations;

a system for performing simulation operations;

a system for generating or presenting virtual reality (VR) content, augmented reality (AR) content, or mixed reality (MR) content;

a system for performing digital twin operations;

a system implemented using an edge device;

a system incorporating one or more virtual machines (VMs);

a system for generating synthetic data;

a system implemented at least partially in a data center;

a system for performing conversational artificial intelligence (AI) operations;

a system for performing generative AI operations;

a system implementing language models;

a system implementing large language models (LLMs);

a system for hosting one or more real-time streaming applications;

a system for performing light transport simulation;

a system for performing collaborative content creation for 3D assets; or a system implemented at least partially using cloud computing resources.

17. A system comprising one or more processors to:

perform at least one iteration of an interleaved diffusion process, at least one iteration of the plurality of iterations comprises:

generating, by a motion model comprising a first model and a second model, human motion data of a human character by applying a random noise and at least one of a text prompt or a kinematic constraint into the motion model, generating the human motion data comprises:

determining, using the first model in each iteration of the at least one iteration, global root motion by denoising noisy global root motion and noisy local joint motion applied as inputs into the first model in a first denoising step;

determining the local root motion based at least on the global root motion; and determining, using the second model in each iteration of the plurality of iterations, local joint motion by applying the noisy local joint motion and local root motion as inputs into the second model and denoising the noisy local joint motion based at least on the local root motion in a second denoising step, the human motion data comprising the local joint motion and the global root motion.

18. The system of claim 17, wherein the global root motion is defined by at least one of a global position of the human character and global heading of the human character;

the local joint motion is defined by at least one of a position of a joint on the human character, a velocity of the joint of the human character, a rotation of the joint of the human character, or a local foot contact of the human character;

the local root motion is defined by at least one of a one-dimensional velocity, a linear velocity, or a height of the human character.

19. The system of claim 17, wherein the one or more processors to determine the local root motion based on the global root motion by transforming the global root motion to the local root motion according to mapping between a global coordinate frame to a local coordinate frame, the global root motion is defined in the global coordinate frame, and the local root motion is defined in the local coordinate frame.

20. A method, comprising:

performing at least one iteration of an interleaved diffusion process, at least one iteration of the plurality of iterations comprises:

generating, by a motion model comprising a first model and a second model, human motion data of a human character by applying a random noise and at least one of a text prompt or a kinematic constraint into the motion model, generating the human motion data comprises:

determining, using the first model in each iteration of the at least one iteration, global root motion by denoising noisy global root motion and noisy local joint motion as inputs into the first model in a first denoising step;

determining the local root motion based at least on the global root motion; and determining, using the second model in each iteration of the at least one iteration, local joint motion by applying the noisy local joint motion and local root motion as inputs into the second model and denoising the noisy local joint motion based at least on the local root motion in a second denoising step, the human motion data comprising the local joint motion and the global root motion.

* * * * *